United States Patent [19]
Lorenz et al.

[11] 3,761,942
[45] Sept. 25, 1973

[54] LOW ENERGY THERMOCHROMIC IMAGE RECORDING DEVICE

[75] Inventors: Max R. Lorenz, Mahopac; Rangaswamy Srinivasan, Ossining, both of N.Y.

[73] Assignee: International Business Machine Corporation, Armonk, N.Y.

[22] Filed: July 28, 1971

[21] Appl. No.: 166,879

[52] U.S. Cl. .................. 346/1, 96/90 PC, 346/108, 346/135
[51] Int. Cl. ...................................................... G01d
[58] Field of Search ................. 346/76 L, 108, 135, 346/1; 96/90 PC; 350/160 P

[56] References Cited
UNITED STATES PATENTS
3,100,778  8/1963  Berman ............................ 96/90 PC
3,212,898  10/1965  Cerreta ............................ 96/90 PC
3,323,244  6/1967  Schreiber ...................... 96/90 PC X
3,428,396  2/1969  Megla et al. ................. 350/160 P X Primary Examiner—Joseph W. Hartary
Attorney—M. Nanes et al.

[57]  ABSTRACT

A thermochromic recording device is prepared from reversible photochromic materials. The photochromic material, dissolved in a plastic matrix, is coated onto a substrate. The coating is exposed to light radiation to produce a color therein. The colored layer or film can be rapidly written upon with low energy lasers or light emitting diodes to effect a visible image. Spots having 3 $\mu$ diameters can be recorded with energies as low as 0.043 nanojoules/$\mu^2$.

3 Claims, 3 Drawing Figures

Patented Sept. 25, 1973

3,761,942

INVENTORS
MAX R. LORENZ
RANGASWAMY SRINIVASAN

BY *Hansel L. McGee*
ATTORNEY

LOW ENERGY THERMOCHROMIC IMAGE RECORDING DEVICE

BACKGROUND OF THE INVENTION

1. Field of the Invention

This invention relates to thermochromic recording devices; more specifically, the invention relates to the reverse mode operation of photochromic recording devices, in which low energy radiation sources can be used to inscribe images thereon.

2. Prior Art

Much is known about the chemistry and chemical reactions of photochromic materials. It is known, for example, that the photocolor reaction of certain of these materials can be reversed thermally. Several of the many studies made on these materials and their reactions can be found in the following publications and patents:

Photo and Thermochromism 1. Infrared Spectra of 1′,3′,3′-trimethyl-6-nitro-8-bromo-spiro [2′+−1-benzopyran-2, 2′-indoline]Doped in Polyacrylonitrile Thin Film by M. Lescinsky, Chem. Zvesti, 23(3); 194-7 U. S. Pat. No. 3,304,180

"Characteristics of the Processer of Coloration and Decolorations of Photochromic Substances Derived From Spiropyrans in Polymer," by M. V. Savostjanova et al., Optiko-Mekkar Prom, 33(4), 9-17 (1966).

"Photographic Process For Repeated Recording and Erasing Optical Information," East German Pat. No. 50,988 to Peter Moeckel.

"Some Water-Soluble Light Sensitive Spiropyrans," U. S. Pat. No. 3,320,067 to L. D. Taylor.

"Photochromic Compounds Containing Two 2-spiropyran Functions," French Pat. No. 1,451,332 to B. Gautron.

"Benzo-B-napthoisospiropyrans And Fluorescent And Photochromic Compositions Therefrom," U. S. Pat. No. 3,413,234, to J. E. Taylor et al.

"Photochromism in Dianthrone And Related Compounds Part III Solutions in Aliphatic Hydrocarbons," T. Bercovicci et al., Israel Journal of Chemistry, Vol. 7, pages 127-133, (1969).

"Photochromic Spiropyrans I. The Effect of Substitutions on the Rate of Ring Closure," E. Berman et al., J. Am. Chem. Soc., 81, p. 5,605 (1959).

"Photochromism in Spiropyrans. Part IV, Evidence For the Existence of Several Forms of The Colored Modification," by R. Heligman-Rim et al., J. Phys. Chem. 66, 2465, 2,470 (1965).

"Photochromism in Spiropyrans. Part VI [1] Trimethylindolino-benzospiropyran And Its Derivatives," T. Bercovicci et al., Mol. PhotoChem., 1(1), 23-55 (1969).

The above references teach or allude to the use of photochromic materials in memory or display devices. However, none of the references have recognized the advantages of operating memory devices using these materials in the reverse mode. That is, there is no teaching or suggestion that low radiation energies could be used to write at very high speeds, i.e., in nanoseconds, by utilizing the reverse chemical reaction of these materials.

SUMMARY OF THE INVENTION

It has been discovered here, that high speed recording can be effected by exposing the colored state of photochromic materials to low energy radiation sources, e.g., lasers or light emitting diodes, to obtain the colorless state thereof. Consequently, there is provided herein a novel recording device in which there is provided a substrate having disposed thereon a film containing a material which is photochromic and which is also thermochromic. The film is changed from its colorless state to its colored state by exposing it to light of appropriate wavelength, e.g., ultraviolet light. The colored film is then written upon by exposing it in a predetermined pattern to a low energy radiation source. The recording can be erased simply by re-exposure to light of appropriate wavelength. The invention eliminates the need for the use of expensive short wavelength light sources that are required in prior art photochromic memories.

The foregoing and other objects, features and advantages of the invention will be apparent from the following more particular description of the preferred embodiments of the invention as illustrated in the accompanying drawings.

PREFERRED EMBODIMENTS OF THE INVENTION

Figure 1:
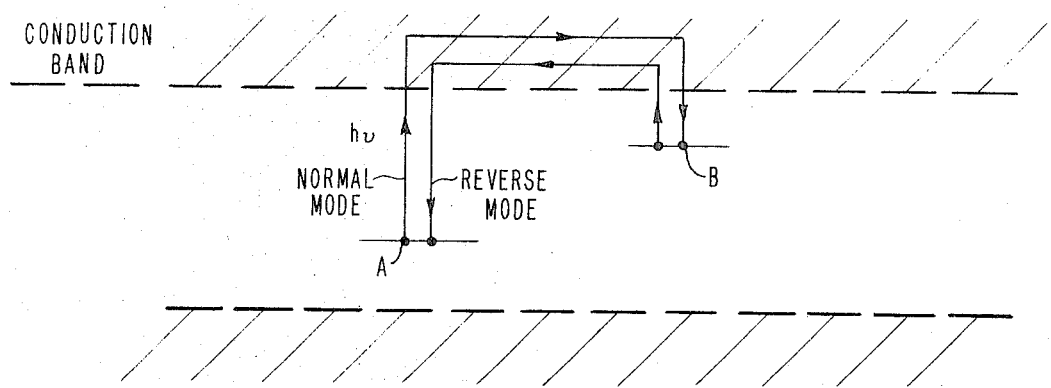
FIG. 1 is an energy diagram indicating the energy requirements necessary for operating photochromic recording devices in their normal mode and in their reverse mode.

The prior art application of photochromic materials to recording devices requires the optical excitation of electrons in ground state A (see FIG. 1) to a conduction band state from which they decay to a metastable state B (normal mode). To achieve this it is ncessary to expose the material to a light having a photon or light energy of 80-90 Kcal/mole or more. In the present invention, advantage is taken of the low energy requirements of operating in the reverse mode, i.e., supplying sufficient heat energy to cause the electrons to go from the metastable state B (colored) to the conduction band back to the ground state A (colorless). It is found that heat energies as small as 16-30 Kcal/mole can be used by operating the device in the reverse mode.

Figure 2:
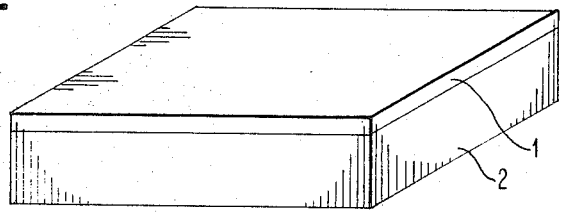
FIG. 2 is an isometric drawing depicting the recording device of this invention.

In the practice of the invention, a photochromic material, which in its color form or state, i.e., metastable state B, will absorb light in the green to far red region of the electromagnetic spectrum, is dissolved in a plastic material. In FIG. 2 a very thin film (1) of this solution having about 30 percent to about 50 percent concentration by weight of the polymeric material of the photochromic is coated on a substrate (2). The colorless film (1) (state A) is flooded with ultraviolet radiation from a conventional ultraviolet source (3) to its colored form (state B). The film is now ready to be written upon conventionally with a low energy laser (4) having power outputs of as little as 1 $m$ watt or less. The laser source can be pulsed or continuous radiation can be used.

It should be understood that laser sources having greater power outputs can also be used. The higher the power output the shorter will be the required time for inscribing information on the colored film. For example, energy sources having power outputs of about 1 m watt requires about 300×10⁻⁹ secs for inscribing a bit of information. On the other hand, an energy source having a power output of about 100 m watt, will require 3×10⁻⁹ secs to inscribe the same information.

Photochromics contemplated for use in this invention can be selected from any of a number of classes of materials which demonstrate the properties of both photochromism and thermochromism. Among the classes of materials which can be used are the spiropyrans and their derivatives. Typical among these materials is 6' nitro-1,3,3 trimethylindolino benzospiropyrane, which has a peak absorption at about 5,600A. This compound has the following chemical structure (1) and undergoes the following reaction when exposed to light and heat radiation to produce the resonant structures II: v, 10/16

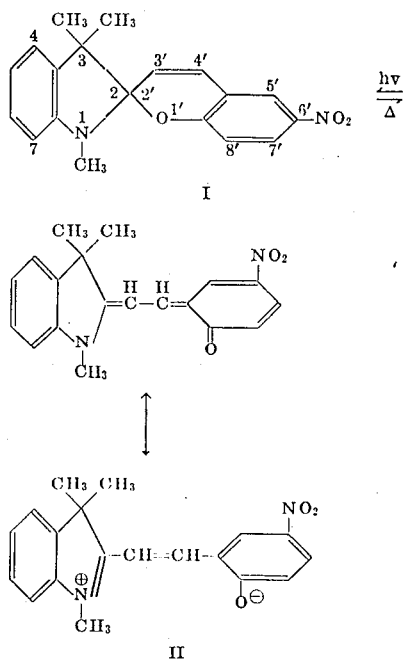

Spiropyran derivatives undergoing similar reversible reactions can be chosen from among 5-OCH₃-,5-OCH₃ -6' Cl-, 5-OCH₃-6' Br-I, 6'-NO₂-, 5-OCH₃-6' NO₂-, 8'-NO₂-, and 5',5'-Cl₂-6'-NO₂- derivatives of 1,3,3 trimethylindolino benzospiropyran. 1,3,3 trimethylindolinonapthospiropyran and derivatives. N-methylacridinonaptho-piropyran, dianthrone, dixanthylene, xanthylideneanthrone and their derivrtves can also be used.

The plastic matrix can be prepared from any of a number of polymeric materials; such as, polymethylmethacrylate polymethacrylate and other acrylics; polyisobutene, polyvinyl butyral; polyvinylchloride polyacrytonitrile, polystyrene, polyvinyl alcohol, polyacrylamide, ethyl cellulose, polymerized varnish among several other well known film forming polymeric substances.

A light sensitive film solution is obtained by preparing a dilute polymer solution in a solvet compatible with the photochromic material. The so prepared solution is saturated with the photochromic material, so that very thin flms having high concentrations of photochromics can be obtained. A typical film forming solution used in the present invention is prepared by dissolving 240 mg of polymethylmethacrylate in 6 ml of acetonitrile, to which was added 100 mg of 1,3,3 trimethylindolino benzospiropyran. This material has a peak absorption at about 5,600A. The solution is then coated onto a substrate by conventional methods, e.g., spinning, dipping, spraying and the like.

The substrate used can be any rigid or flexible material to which the polymeric film will adhere. It can be transparent as well as opaque. The following materials can be used as substrates; glass, metals and any of the above-mentioned polymeric substances.

In operation, the coated substrate is exposed to a conventional mercury ultraviolet lamp for about 10 minutes to convert the colorless film to its colored state. It is then written upon with a 300 nano sec. pulsed Krypton laser beam having a wave length of 5,680A and an energy of about 1m watt. A series of 3 $\mu$ diameter spots is obtained thereby. The energy requirement for recording these spots is found to be only about 0.043 nanojoules/$\mu^2$. The spots can be erased by simply re-exposing the film to ultraviolet radiation. In prior art photochromic devices where the colorless film is written upon to record the desired information in color, a ultraviolet light source is needed, i.e., light having a far shorter wavelength than that used in this invention. Consequently, the energy required to record 3 $\mu$ diameter spots is at least about 5 times greater than the requirements of the present invention.

Figure 3:
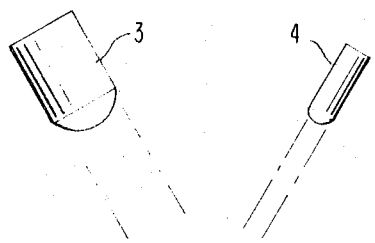
FIG. 3 is an isometric drawing depicting another aspect of the recording device shown in FIG. 2
Figure 3:
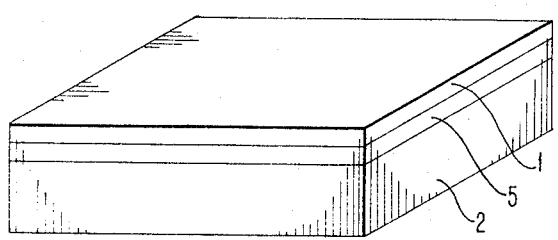

In another aspect of the invention there is provided a recording device (see FIG. 3), in which a metal film (5) is interposed between the active film (1) and the substrate (2). The metal film has a relatively flat absorption response, thus will absorb radiation and by heat conduction transfer energy to the active film (1). Consequently, the device is decolorized independent of the wavelength transmitted from the writing radiation source (4). Stated another way, radiation sources used for inscribing information having radiation wavelengths in the infrared region of the electromagnetic spectra, and which are not necessarily absorbed by the photochromic material can be used. For example, injection lasers such as GaAs lasers and light emitting diodes can be used effectively. The metal used can be, for example, Cu, Ni, Ag, Au, and the like. In operation, the active film containing 1,3,3 trimethylindolino benzospiropyran is exposed to ultraviolet radiation from radiation source (3) for a time sufficient to change it from its colorless state to its colored state, e.g., about 10 minutes. Radiation from radiation source 4, e.g., a GaAs injection laser, having a wavelength of about 9,000A can be used to inscribe information on the active film (1). The metal film absorbs the heat energy from radiation source (4) which is transferred to active film (1). The active film (1) is thus decolorized in the pattern inscribed by radiation from source (4).

It should be understood that the energy required to write can be varied according to the absorption spectrum of the particular thermochromic material used. For example, by chemically modifying the particular photochromic material, the region of radiation absorption can be shifted. Similarly, the addition of light sensitive materials to the matrix material can also change the energy requirements for writing.

What is claimed is:

1. A method for the low energy recording of an image on photochromic materials which are thermochromic in their reverse mode which includes the steps of:
   a. preparing a film having a photochromic material dissolved in a plastic matrix, said material being one which becomes colored upon its exposure to a light source and which, in its colored state, becomes discolored upon its exposure to a low energy radiation source, said material being selected from the group consisting of 1,3,3 trimethylindolino benzospiropyran and its 5-$OCH_3$, 5-$OCH_3$-6' Cl, 5-$OCH_3$-5Br, 6'-$NO_2$, 5-$OCH_3$-6'$NO_2$, 8.$NO_2$ and 5',5'$Cl_2$-6'-$NO_2$ derivatives, 1,3,3 trimethylindolino napthospiropyran and its derivatives, and dianthrone, dixanthylene, xanthylideneanthrone and their derivatives;

b. exposing said film to a light energy sufficient to produce a color in said film; and c. writing upon said colored film with a low energy laser source which has a power output not exdeeding 1 $m$, watt.

2. A low energy image recording device comprising a. a substrate;

b. an active film comprising a photochromic material dissolved in a plastic matrix, said film being disposed on said substrate, said material being one which becomes colored upon its exposure to a light source and which is changed from its colored to its decolored state upon its exposure in its colored state to a low energy radiation source, said material being selected from the group consisting of 1,3,3 trimethylindolino benzospiropyran and its 5-$OCH_3$-6.$NO_2$, 8'-$NO_2$ and 5, 5'-$Cl^2$-6'-$NO_2$ derivatives, 1,3,3 trimethylindolino naphthospiropyran and its derivatives, and dianthrone, dixanthylene, xanthylideneanthrone and their derivatives;

c. a light source for effecting the coloration of said film; and d. a laser radiation source having a power output not exceeding 1 $m$ watt for inscribing information on said active film by selectively decolorizing said film in its colored state in a predetermined pattern.

3. A low energy image recording device as defined in claim 16 and further including:

e. a metal film interposed between said substrate and said active film for absorbing radiation and transferrng said absorbed radiation as heat energy to said active film.

* * * * *